N. W. KLEINMAN.
DIRECTION INDICATOR.
APPLICATION FILED JAN. 18, 1916.
1,316,486.
Patented Sept. 16, 1919.
5 SHEETS—SHEET 2.
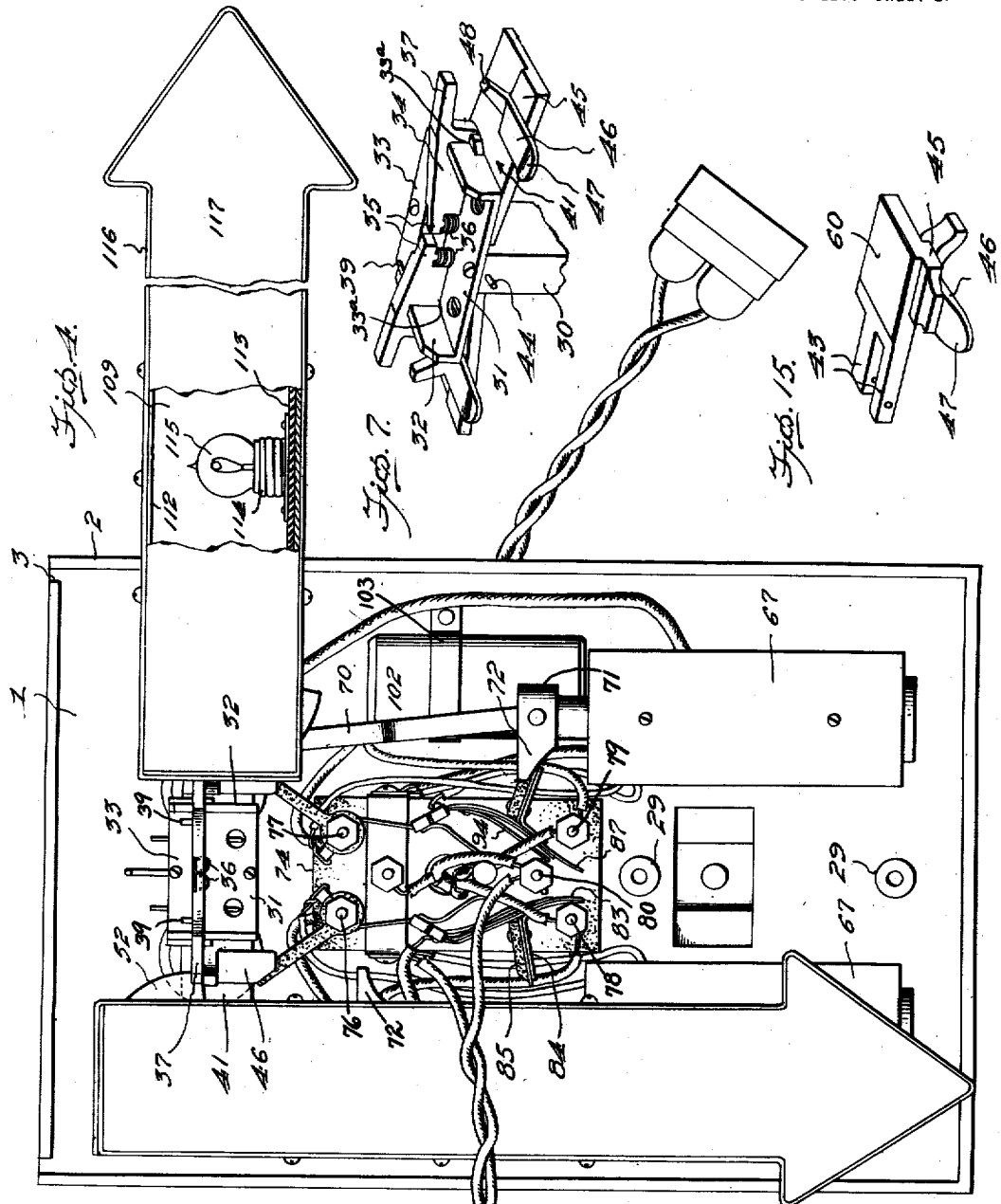
Witnesses
Paul M. Hunt
H. Faye
Inventor
N. W. Kleinman
By [signature]
Attorney N. W. KLEINMAN.
DIRECTION INDICATOR.
APPLICATION FILED JAN. 18, 1915.
1,316,486.
Patented Sept. 16, 1919.
5 SHEETS—SHEET 3.
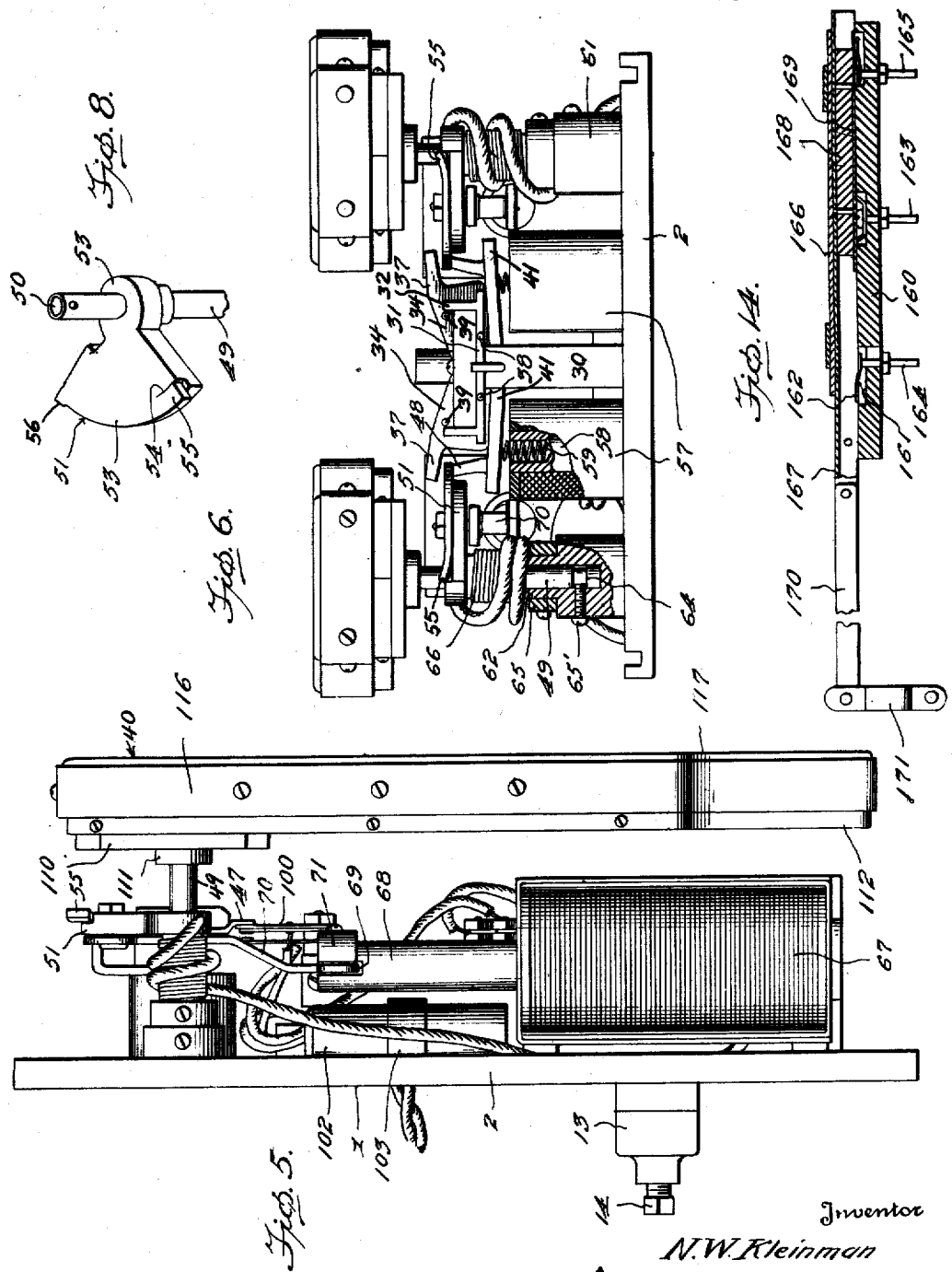
Inventor
N. W. Kleinman
Witnesses
By 
Attorney

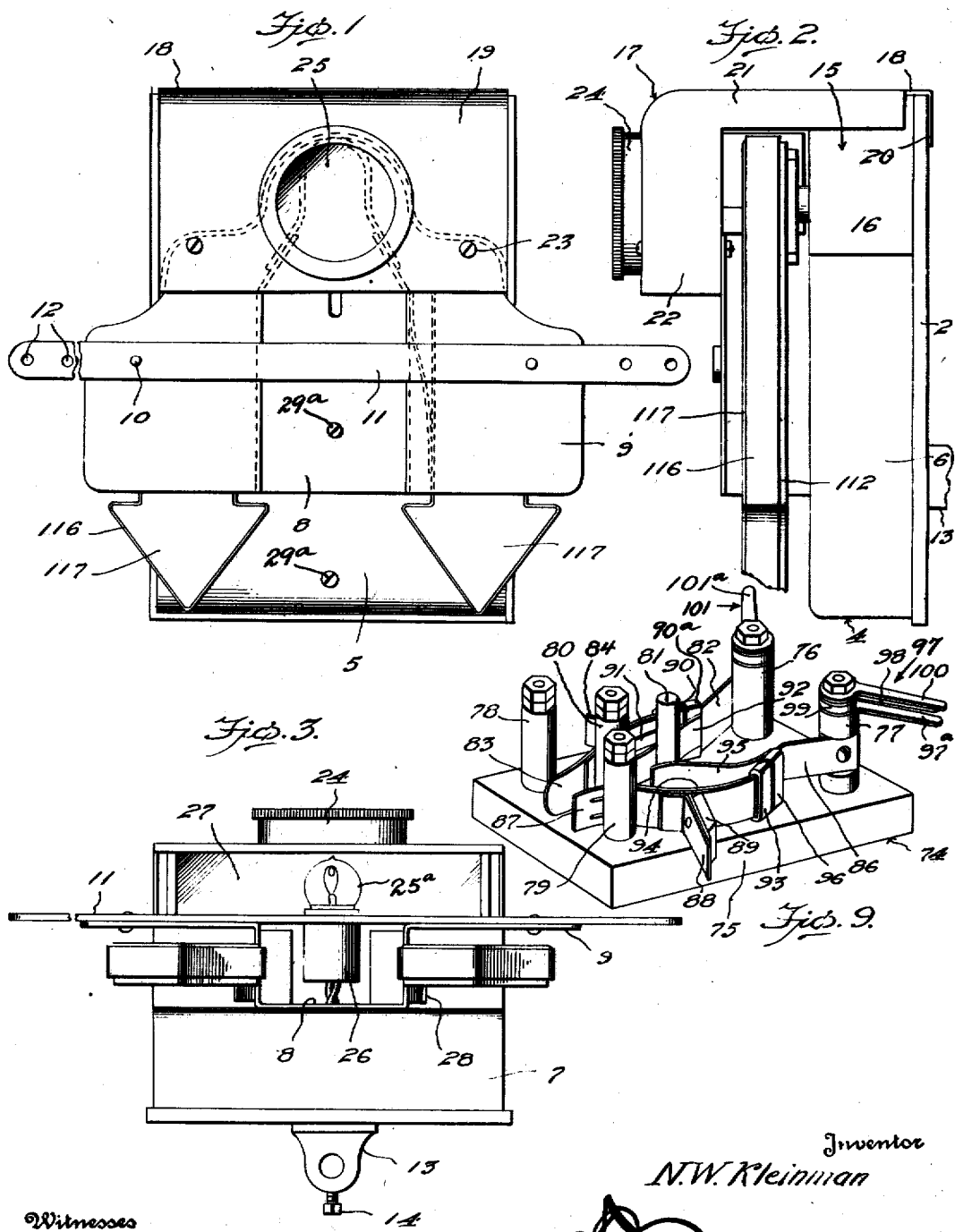

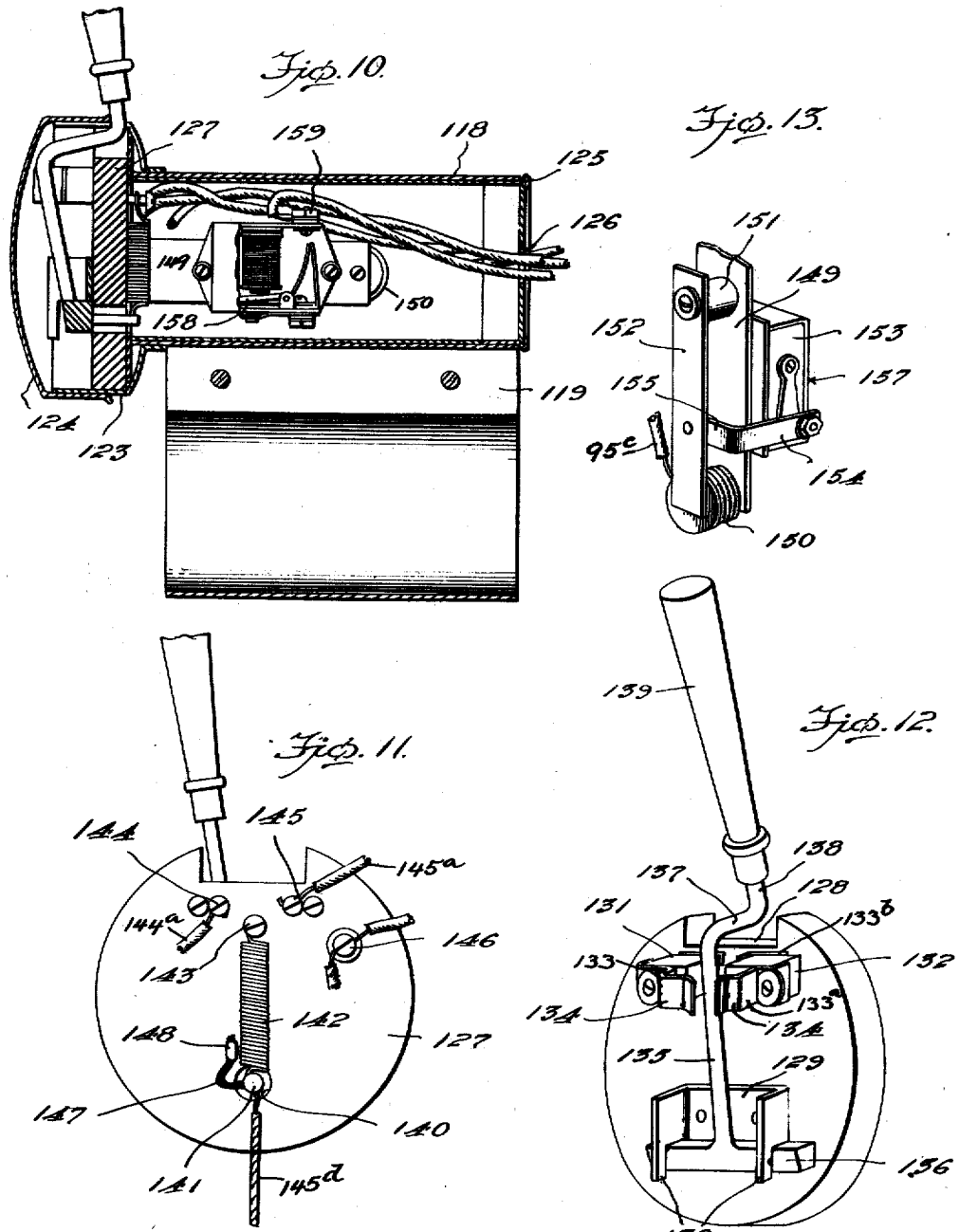

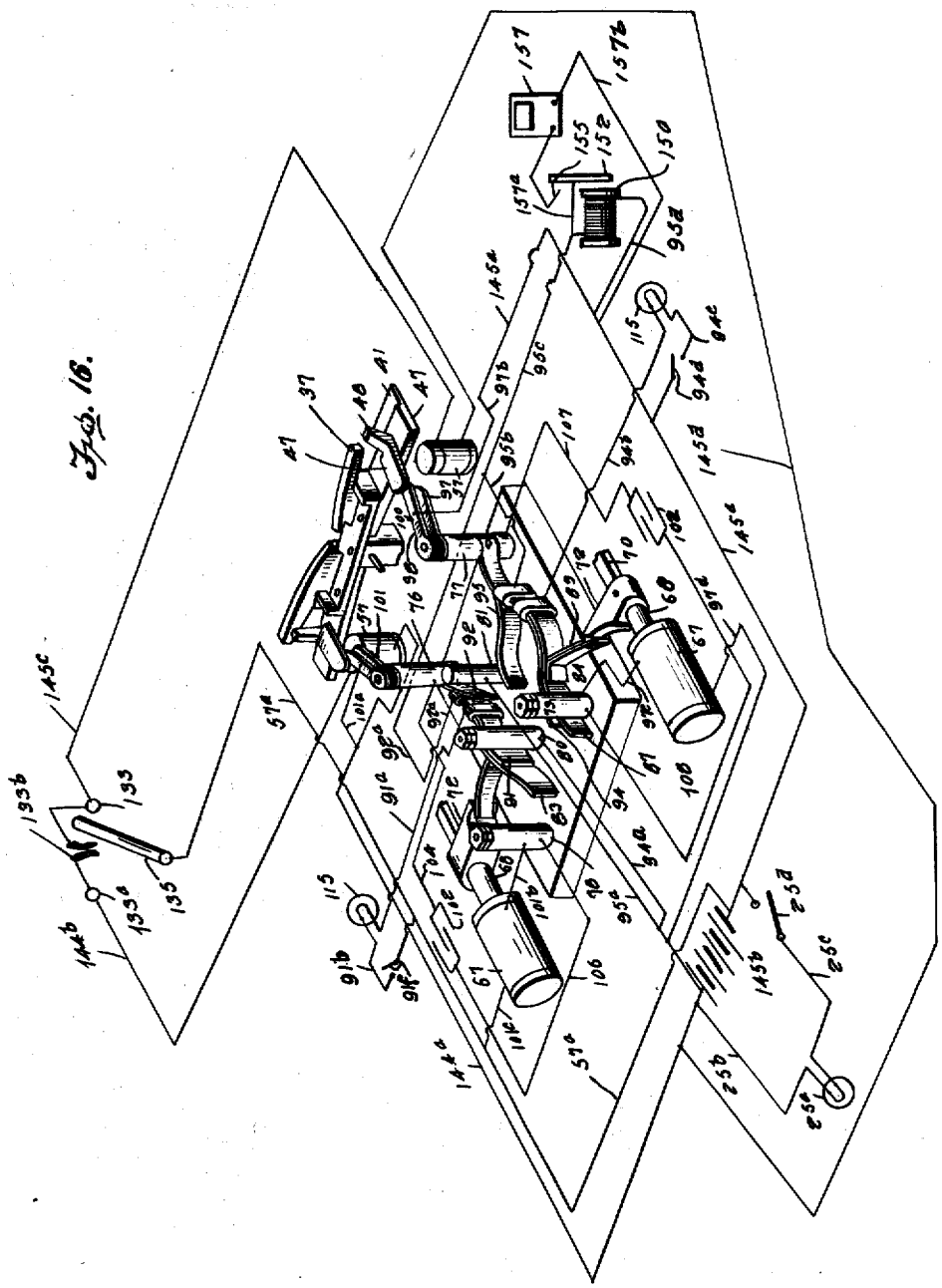

UNITED STATES PATENT OFFICE.

NATHANIEL W. KLEINMAN, OF BROOKLYN, NEW YORK.

DIRECTION-INDICATOR.

1,316,486.   Specification of Letters Patent.   Patented Sept. 16, 1919.

Application filed January 18, 1916. Serial No. 72,760.

*To all whom it may concern:*

Be it known that I, NATHANIEL W. KLEINMAN, a citizen of the United States, residing at Brooklyn, in the county of Kings and State of New York, have invented certain new and useful Improvements in Direction-Indicators; and I do hereby declare the following to be a full, clear, and exact description of the invention, such as will enable others skilled in the art to which it appertains to make and use the same.

This invention relates to new and useful improvements in direction indicators and more particularly to that class of indicators adapted to be connected to motor vehicles in order that vehicles following the same will be warned of the intention of the driver to turn.

Another object of the invention is to provide a device wherein the operator of the vehicle may readily signal the direction he is contemplating taking, thereby avoiding many accidents and much injury to both the occupants of the vehicle and the vehicle itself.

Still another object of the invention is to provide a device which is adapted to take the place of the usual rear signal or tail lamp and also to illuminate the license plate.

A further object of the invention is to provide a lock for holding the indicating arrows against accidental movement when in their non-indicating positions and releasing the lock automatically upon the energization of the arrow controlling solenoids, by the simultaneous energization of the lock controlling electromagnets.

Still another object of the invention is to provide a locking means for holding the arrows in indicating position without the necessity of keeping the solenoids energized thereby reducing the consumption of electric currents to a minimum.

A still further object of the invention is to provide means to illuminate the arrows at the time they reach indicating position so as to render the device effective for use at night.

Another object of the invention is to provide a signaling means by which the operator of the vehicle on which the device is used is warned in event that the indicator arms do not act properly.

Still another object of the invention is to provide a means by which both arrows may be thrown into indicating position, thus signaling those in the rear of the vehicle of the driver's intention to stop.

As a further object, the invention provides a novel method of pivotally mounting the indicating arrows on the base plate and retaining the same in proper position.

As still another object, the invention provides a means to prevent carbon from forming at the contact points and rendering the device inoperative and also to provide a controlling switch which is so arranged as to control the various circuits through the device according to the position of the solenoid armatures.

Another and more specific object of the invention is to provide a device which may be connected to an automatic switch operated upon the turning of the steering wheel of the vehicle to control the movement of the indicating arm.

A further object of the invention resides in the provision of a novel form of control switch which is adapted to be connected to the axle of the vehicle and to the steering rod so that upon the turning of the wheels the switch will be actuated.

Further, the invention has for its object to provide a housing which will effectively protect the working parts from injury, prevent the accumulation of dust and dirt on the various parts and also house the same against the elements.

With these and other objects in view, the invention consists in the novel combination and arrangement of parts which will be fully set forth in the following specification and accompanying drawings, in which:—

Figure 1 is a face view of the indicator.

Fig. 2 is a side view thereof.

Fig. 3 is a bottom plan view of the indicator.

Fig. 4 is a face view of the indicator showing the housing removed and one arrow in signaling and the other in non-signaling position.

Fig. 5 is a side view in elevation of Fig. 4.

Fig. 6 is a top plan view of the indicator with the housing removed, showing both arrows in non-signaling position, and having portions thereof in horizontal section.

Fig. 7 is a detail perspective view of the latch for holding the indicator arms in their non-indicating position.

Fig. 8 is a detail perspective view of one of the plates carried by the arrows.

Fig. 9 is a detail perspective view of the switch mounted within the indicator and controlling the various circuits flowing therethrough.

Fig. 10 is a longitudinal sectional view through the control switch of the device.

Fig. 11 is a bottom plan view of the insulator and base plate of the control switch illustrated in Fig. 10.

Fig. 12 is a detail perspective view of the plate of the control switch.

Fig. 13 is a fragmentary perspective view of the magnet and supporting post carried by the insulating block illustrated in Fig. 12.

Fig. 14 is a longitudinal sectional view through a modified form of control switch.

Fig. 15 is an inverted perspective view of one of the wings illustrated in Fig. 7, and Fig. 16 is a perspective view illustrating the wiring diagram.

Referring to the drawings by reference numerals, 1 designates a vertical base plate provided at its edges with a flange 2. The upper horizontal member of the flange 2 is provided with notches 3. Secured to the base plate 1 within the flange 2 is a lower housing section 4 which comprises a front wall 5, side walls 6 and a bottom wall 7. A transversely extending U-shaped plate 8 is secured to the outer side of the wall 5, and the outer terminals of the arms of this plate terminate in laterally directed flanges 9 which extend beyond the sides of the base plate 1, as clearly illustrated in Figs. 1 and 3. Secured to the flanges by rivets 10 is a license plate supporting bar 11, the ends of which extend beyond the side edges of the flanges 9 and are provided with apertures 12 for the reception of bolts by means of which a license plate may be secured thereto. It will be understood that when the license plate is in place, it will cover the indicating arrows when they are in non-signaling position.

The rear side of the base plate 1 carries an attaching bracket 13 provided with a set screw 14 by means of which the device may be secured to the vehicle.

An upper housing section 15 is secured to the base plate 1 within the flange 2 and includes a front wall, side walls 16 engaging in the notches 3, and a top wall, the side walls 16 overlying the side walls 6 to prevent water entering the lower housing section. A hood 17 is secured to the upper end of the base and the housing section 15 and consists of a top wall 18, a front wall 19, and a downturned rear flange 20 which engages the rear face of the base plate 1, as shown in Fig. 2. Downturned side flanges 21 are formed on the lateral edges of the top wall 18 and are connected to the side walls 22 which latter are spaced from the front wall of the housing section 15, as clearly illustrated in Fig. 2, to accommodate the indicating arrows. The rear edges of the side walls 22 engage the outer faces of the flanges 9 and bolts 23 pass through said flanges and the wall 19. The bolts 23 and flange 20 secure the hood 17 in position. The front wall 19 has a central opening surrounded by a collar 24 in which is secured a lens 25 which is preferably ruby red so as to provide the usual rear signal light for the vehicle.

A lamp bulb 25ª is positioned behind the lens 25, and it is inclosed by a hood which is indicated by dotted lines in Fig. 1 and which carries a socket 26 in which the lamp bulb is mounted. A glass panel 27 is secured in the hood and forms the bottom wall thereof so that the light of the lamp bulb 25ª will be shed downwardly upon the license plate supported by the bar 11. Secured to the arms of the plate 8 are cushioning springs 28 adapted to be engaged by the indicating arrows during their return to non-signaling position.

Secured to and extending forwardly from the base plate 1 are studs 29 for the reception of retaining bolts 29ª by which the lower housing section 4 and plate 8 are held in place.

Secured to the base plate 1 and extending forwardly therefrom is a standard 30 having an outer bifurcated end. A transversely extending plate 31 is secured to the outer end of the standard 30 and is provided at its ends with forwardly extending flanges 32. A forwardly extending flange 33 is secured to the plate 31 near its upper edge between the flanges 32. Formed in the plate 31 and flanges 32 near the flange 33, is a pair of slots 33ª to accommodate latches 34 which are provided at their inner ends with extensions 35 in rear of which compression coil springs 36 are mounted. The springs 36 exert forward pressure on the inner ends of the latches 34 so as to normally hold the latch fingers 37 in locking position. It will be seen upon reference to Fig. 6 that the latches 34 are pivoted intermediate their ends by pins 38 to the plate 31. Stop pins 39 carried by the latches 34 are adapted to engage the flange 33 to limit the movement of the latches by the springs 36. The latches 34 engage armatures 41 which are provided at their inner ends with arms 43. The arms 43 are pivoted in the outer end of the standard 30 by a pin 44. Secured to the outer side of each armature 41 is an enlargement 45 carrying a member 46 which has its upper end provided with a forwardly directed latch finger 48. The latch fingers 48 are located slightly below the latch fingers 37 and arranged at right angles with relation thereto. The lower ends of the members 46 extend below the armature 41 and form switch closing members 47.

An indicating arrow 40 is pivoted at one end by means of an arm 49 to the base plate 1 on each side of the latch structure. The arms 49 are fixed to the arrows 40 and are journaled in bosses 61 secured to the base plate 1. The arms 49 are retained in the bosses 61 by bolts 65' which are carried by the bosses 61 and which engage in grooves 64 in the arms 49. By reference to Fig. 8, it will be seen that the pivot arms 49 are each provided with a sector plate 51. At their apexes the plates 51 are provided with hubs 53 through the medium of which they are secured to the arms 49, and at their arcuate edges they are provided with flanges 53'. At one end each flange 53' is provided with a tongue 55, and at its other end with a lug 56. The tongues 55 coöperate with the latch fingers 37 to support the arrows 40 in elevated or signaling position, and the lugs 56 coöperate with the latch fingers 48 to secure the arrows 40 in lowered or non-signaling position.

An electro-magnet 57 is secured to the base plate 1 in rear of each armature 41. The cores 58 of the magnets 57 are provided with bores for the reception of compression coil springs 59 which engage the rear sides of the armatures 41 to normally hold the latch fingers 48 in operative position and the latch fingers 37 in inoperative position against the tension of the spring 36. Plates 60 of copper or similar non-magnetic material are secured to the rear sides of the armatures 41, to prevent them from sticking to the cores 58. Adjustably mounted on the reduced cylindrical extensions 62 of the bosses 61 are rings or collars 65 which are held in place by set screws and which provide means by which the tension of torsional springs 66 may be adjusted. These springs are employed to assist in raising the indicating arrows 40 into signaling position.

In addition to the spring 66, solenoids 67 are employed for the purpose of raising the indicating arrows 40 into signaling position. These solenoids are vertically arranged and have the upper ends of their cores 68 bifurcated as at 69. Pivotally secured in the bifurcated end of the cores 68 are the lower ends of links 70. The upper ends of the links are pivotally connected to the sectors 51. Carried by the upper ends of the cores 68 are clips 71 having fingers 72 adapted to engage the automatic circuit controlling switch 74 which is best illustrated in Fig. 9. The switch consists of an insulating base block 75 provided at its upper end with forwardly extending posts 76 and 77. Near its lower end the block 75 is provided with the forwardly extending posts 78 and 79, and secured to the block 75 above and in a plane centrally between the posts 78 and 79 is a forwardly extending post 80. A forwardly extending post 81 is secured to the block 75 in alinement with the post 80 and below the posts 76 and 77. Secured to the post 76 is a spring 82 which is provided with an offset angular extension terminating in a curved contact tongue 83. This tongue is normally held in engagement with the post 78 by the spring 82 to electrically connect this post with the post 76. A laterally extending arm 84 is secured to the spring 82 and carries an insulator 85 which is adapted to be engaged by the finger 72 on the core of the adjacent solenoid 67 when this solenoid is energized. The spring 82 carries spring contact tongues 91 and 92 which are connected thereto by clips 90 and 90ª, respectively. These clips are insulated from the spring 82. When the insulator 85 is engaged by the finger 72, the tongue 83 is moved out of engagement with the post 78, and the tongues 91 and 92 are moved into electrical engagement with the posts 80 and 81.

A spring 86 is secured to the post 77 and is provided with an angular offset extension which terminates in a curved contact tongue 87. This tongue is normally held in engagement with the post 79 by the spring 86 to electrically connect this post and the post 77. A laterally extending arm 88 is secured to the spring 86 and carries an insulator 89 which is adapted to be engaged by the finger 72 on the core of the adjacent solenoid 67 when this solenoid is energized. The spring 86 carries spring contact tongues 94 and 95 which are connected thereto by clips 93 and 96, respectively. These clips are insulated from the spring 86. When the insulator 89 is engaged by the finger 72, the tongue 87 is moved out of engagement with the post 97, and the tongues 94 and 95 are moved into electrical engagement with the posts 80 and 81, respectively.

Secured to the outer end of the post 77 is a switch 97 which comprises a spring blade 97ª and a spring blade 98. The blade 98 is mounted at the outer end of an insulating block 99 which is positioned on the outer face of the blade 97ª. The blade 98 has secured to its outer face a strip of insulation 100. The post 76 supports a switch 101 which in construction is a duplicate of the switch 97. The blade of switch 101 which corresponds to the blade 98 of switch 97 is provided with a strip of insulation 101ª.

In order to prevent the sparks caused by the moving contact from forming carbon over the contact points there are provided condensers 102 which are held in place by clips 103. One of said condensers is connected by means of a wire 104 to the post 76, while the wire 106 is connected to the post 78. A wire 107 leads from the opposite condenser to the post 77 and the opposite terminal of said condenser is connected by a wire 108 to the post 79.

Each indicating arrow consists of a back wall 109. A plate 110 is secured to the back wall 109 and carries a hub 111. The hollow end of the arm 49, which is secured to the hub 111, extends through the hub plate 110 and the base 109 into the arrow. Secured to the side edges of the back wall 109 is a side wall 112 which carries an insulating strip 113 carrying the lamp sockets 114. These sockets support bulbs 115 so that when the device is used at night, the indicating arrows may be seen. A binding strip 116 coöperates with the wall in holding the celluloid panel 117 in place. The outer side of said panel is preferably white to render the same easily distinguishable in the day time while the inner side is preferably red so that when the same is illuminated it may be readily distinguished at night.

The control switch shown in Figs. 10 to 13 inclusive, comprises a tubular body 118 to which is secured a clamp 119 adapted to secure the switch to the steering column of the vehicle on which the indicator is used. A head 123 is secured to the upper end of the tubular body 118 and is closed by a removable cap 124. A cap 125 closes the lower end of the body 118 and is formed with a central opening 126 through which the various wires leading to the indicator pass.

Secured in the head 123 is an insulating plate 127 which is provided with the recess 128 in its edge. A U-shaped bearing 129 is secured to the upper face of the insulating plate 127 and the side edges of the arms thereof are formed near their outer terminals with parallel fingers 130 which form guides for a switch bar 136. Secured to the upper face of the plate 127 in relatively spaced relation and in spaced relation to the plate 129 are blocks 131 and 132. Contacts 133 and 133ᵃ are secured to the blocks respectively. Each contact carries a spring clip 134 which is adapted to retain the switch arm 135 in engagement with the contact when the indicator is indicating one or the other direction.

The switch arm 135 is secured at one end to the bar 136. An angular extension 137 projects from the opposite end of the switch arm 135 and is provided with the arm 138 carrying the handle 139. The extension 137 works in the recess 128. An aperture 140 is formed in the plate 127 for the reception of a stem 141 carried by the bar 136. A retractile coil spring 142 located on the under side of the plate 127 is secured to the stem 141 and to a screw 143. A binding screw 144 is connected to the contact 133ᵃ and a binding screw 145 to the contact 133. These binding screws have connected thereto wires 144ᵃ and 145ᵃ, respectively. A binding screw 146 is secured to the under side of the plate 127 and has connected thereto a wire 156. A wire 147 is attached to the stem 141 and is soldered at 148 to one of the attaching screws of the plate 129, which is in electrical connection with the depending supporting post 149 which is attached to the under side of the plate 127 and which carries at its lower terminal the electro-magnet 150. A support 151 is secured near the upper end of the post 149 and carries the spring arm 152, the lower end of which is adapted to be attracted by the armature of the magnet 150. A buzzer 153 is secured to and insulated from the post 149 and secured to the buzzer and in electrical contact with the frame thereof is an arm 154 provided with a finger 155 which is adapted to be engaged by the spring 152 when the latter is attracted by the magnet 150. A wire 95ᶜ leads from one terminal of the magnet and is connected to the binding post 146. The buzzer 153 is provided with the usual vibrating armature 158 and carries a binding post 159 to which wire 157ᵃ is connected. The arm 154 is connected to the opposite binding post and it will thus be seen that unless the electro-magnet 150 is energized, the buzzer cannot be operated. It is to be understood that the buzzer may take the form of any suitable signaling means positioned at any desired point on the vehicle on which the device is used in order to enable the operator to determine whether the signal is properly operating.

In order that the indicator may be operated automatically, the switch illustrated in Fig. 14 is provided and consists of an insulating plate 160 which is adapted to be rigidly connected to the vehicle frame and this plate is provided with a plurality of spaced recesses 161 in which the contact springs 162 are mounted. The central contact spring is connected to a binding post 163 which leads to a power source while the lateral springs are connected to suitable binding posts 164 and 165, respectively, which lead to their respective magnets 57. A guide 166 for the slide 167 carrying the non-conducting strip 168, is secured to the plate 160. The inner face of the strip 168 is provided with the conductor plate 169. This plate is of a length sufficient to bridge the space between the central contacts 163 and one of the lateral contacts so that when the slide 167 is moved longitudinally of the plate, the current will flow from the binding post 163 across to the binding post 164 or 165 and thence to one of the magnets 57. A link 170 is pivoted to one end of the slide 167 and is adapted to be attached by a coupling 171 to the steering knuckle of the vehicle. In this way it will be seen that the slide will automatically move with the turning of the steering wheel thereby securing the automatic operation of the indicator.

The operation of the direction indicator may be briefly stated to be as follows:

When it is desired to move the right hand arrow 40 into signaling position to indicate that the driver of the automobile intends to turn to the right, the switch arm 135 is moved into engagement with the contact 133. This closes the circuit through the wire 145$^d$ which leads from one side of the battery 145$^b$ to the magnet 57, the wire 145$^c$ leading from the magnet to the contact 133, and the wire 57$^a$ leading from the other side of the battery to the switch blade 135. The closing of this circuit energizes the magnet 57, and the consequent attraction of the armature 41 withdraws the latch finger 48 out of engagement with the lug 56 on the sector 51 and moves the member 47 into engagement with the insulated strip 100 carried by the blade 98 of the switch 97, resulting in the releasing of the arrow 40 and in the closing of the switch 97. The closing of this switch establishes a circuit through the wire 97$^b$ which leads from the wire 145$^a$ to the blade 98 of the switch, through the blade 97 and post 77, through the contact tongue 87 and post 79, through the wire 97$^c$ which leads from the post 79 to the solenoid 67, through the wire 97$^d$ which leads from the solenoid to the other side of the battery 145$^b$. The energization of the solenoid 67 moves its core 68 downwardly, resulting in the raising of the arrow 40 into signaling position, which is held in such position by the latch finger 37 engaging the tongue 55 on the sector 51. As soon as the arrow reaches signaling position, the contact tongue 87 is moved out of engagement with the post 79, resulting in the breaking of the circuit through the solenoid 67. This circuit remains broken during the time that the arrow is in signaling position. The movement of the contact tongue 87 out of engagement with the post 79, is caused by the engagement of the insulator 89 by the tongue 72 when the core 68 has moved down far enough to raise the arrow into signaling position. At the same time that the contact tongue 87 is moved out of engagement with the post 79, the contact tongues 94 and 95 are moved into engagement with the posts 80 and 81, respectively. When the tongue 94 is in engagement with the post 80 a circuit is closed through the wire 94$^a$ which leads from one side of the battery 145$^b$ to the post 80, through the post 80, through the contact tongue 94, through the wire 94$^b$, through the lamps 115 in the arrow, through the wire 94$^c$, through the switch 94$^d$, through the wire 145$^a$ to the opposite side of the battery. The lamps 115 are to be used only at night, and during the day the switch 94$^d$ is left opened. When the contact tongue 95 is in engagement with the post 81 a circuit is established through the wire 95$^a$ which leads from one side of the battery to the post 81, through the post 81, through the contact tongue 95, through the wire 95$^b$, through the wire 95$^c$, through the electro-magnet 150, through the wire 95$^d$ and wire 145$^a$ back to the battery. The energization of this magnet attracts its armature 152 closing the circuit through the buzzer 157. This circuit includes the wire 157$^a$ which leads from the wire 95$^c$ to the armature 152, the armature 152, the finger 155 which is connected to one side of the buzzer, and the wire 157$^b$ which is connected to the other side of the buzzer and to the wire 145$^a$.

From the foregoing it should be apparent that as soon as the arrow has been moved into indicating position, the circuit including the solenoid is broken, the circuit including the lamps 115 is closed provided the switch 94$^d$ is not opened, and the circuit including the buzzer 157 is closed.

When it is desired to lower the arrow into non-signaling position, the switch blade 135 is moved out of engagement with the contact 133. This deënergizes the electro-magnet 57, and allows the spring 59 to move the armature 41 outwardly, resulting in the latch finger 37 being moved out of engagement with the tongue 55, and the latch finger 48 being moved into engagement with the rear side of the flange 53'. This frees the arrow, and it immediately gravitates into non-signaling position. The flange 53' will move beyond the latch finger 48 just before the arrow reaches its non-signaling position so as to permit the latch finger to be moved by the spring 59 in position to be engaged by the lug 56 when the arrow reaches its non-signaling position. The return of the arrow to non-signaling position, raises the core 68 of the solenoid 67. The finger 72 is thus moved out of engagement with the arm 88, permitting the spring 86 to move the contact tongue 87 into engagement with the post 79 so that when the switch 97 is again closed the solenoid will be energized, and to move the contact tongues 94 and 95 out of engagement with the posts 80 and 81, respectively, breaking the circuit including the arrow lamps 115 and also breaking the circuit including the buzzer 157.

When it is desired to move the left hand arrow 40 into signaling position to indicate that the driver intends to turn to the left, the switch arm 135 is moved into engagement with the contact 133$^a$. This closes the circuit through the left hand magnet 57, resulting in the releasing of the left hand arrow and the closing of the switch 101. The magnet circuit includes the wire 144$^a$ leading from one side of the battery 145$^b$ to the magnet, the wire 144$^b$ leading from the magnet to the contact 133$^a$, the switch arm 135, and the wire 57$^a$ which leads from the switch arm 135 to the other side of the battery. The closing of the switch 101 energizes the left hand solenoid 67, resulting in the left hand arrow being moved into signaling position. The circuit for this solenoid includes the wire 101ª leading from the wire 144ª to the switch 101, the post 76, the contact tongue 83, the post 78, the wire 101ᵇ, the wire 101ᶜ and the wire 57ª. As soon as the arrow has been moved into signaling position, the finger 72 moves the contact tongue 83 out of engagement with the post 78 and moves the contact tongues 91 and 92 into engagement with the posts 80 and 81, respectively, resulting in the breaking of the solenoid circuit, and the closing of the circuit for the arrow lamps 115, provided the switch 91ᶠ is closed, the closing of the circuit for the buzzer 157. The circuit for the arrow lamp 115 includes the wires 94ª, the post 80, the contact tongue 91, the wire 91ª, the wire 91ᵇ, the switch 94ᶠ, and the wire 57ª. The buzzer circuit includes the wire 95ª, the post 81, the contact tongue 92, the wire 92ª, the wire 95ᶜ, the wire 95ᵈ, the wire 145ª and the wires 157ª, 155 and 157ᵇ.

When the automatic switch shown in Fig. 14 is used, the wire 145ᵈ is connected to the contact 163, the wire 144ᶜ to the contact 164 and the wire 145ᵇ to the contact 165.

The tail lamp 25ª is connected to the battery 145ᵇ by wires 25ᵇ and 25ᶜ. A switch 25ᵈ provides means by which the current to the lamp 25ª may be established or cut off.

When it is desired to move both arrows to signaling position to indicate that the driver intends to stop, the switch arm 135 is moved between and in engagement with the contacts 133ᵇ.

What is claimed is:

1. In a direction indicator, a pair of pivoted indicating arms, locking plates carried by the arms, electro-magnetic released locking means engaging the locking plates and holding the arms in non-indicating position, solenoids for bringing the arms into indicating position, the solenoids and electro-magnetic released locking means being energized simultaneously, and means for breaking the circuit through the solenoids and simultaneously illuminating the arms upon reaching their indicating position.

2. In a direction indicator, a pair of pivoted indicating arms, electro-magnetic released locking means for holding the arms in their non-indicating position, solenoids connected to and adapted to swing the arms into indicating position, said solenoids and electro-magnets being energized simultaneously, means to break the circuit through the solenoids at the instant that the arms reach indicating position, and means for selectively and simultaneously controlling the movements of the arms.

3. In a direction indicator, a base plate, a socket secured to the base plate, a reduced cylindrical extension on the socket, an arm rotatably mounted in the socket, said arm being provided with an annular groove around its inner end, a set screw adapted to extend through the socket and into the groove to prevent the arm from being removed, an adjustable collar surrounding the reduced cylindrical extension, a torsional spring surrounding the reduced extension and connected to the collar, means to hold the collar in adjusted position on the reduced extension, means carried by the rotatable arm to connect the outer end of the spring thereto, and an indicating arm carried by the outer end of the arm.

4. A direction indicator including a pivoted indicator arm, electrically operated means for moving the arm into signaling position, electrically operated means for securing the arm in non-signaling position, said second means being adapted when operated to release the arm and to energize said first means, said second means being adapted to also secure the arm in signaling position, a source of current, and a controlling switch.

5. A direction indicator including a pivoted indicator arm, electrically operated means for raising said arm into signaling position, means for deënergizing said means when the arm reaches signaling position, an electrically controlled latch structure, a source of current, and a controlling switch.

6. A direction indicator including a pivoted indicator arm, electrically operated means for moving said arm into signaling position, means for deënergizing said first named means when the arm reaches signaling position, electrically and mechanically operated means associated with said arm for securing the arm in either signaling or non-signaling position, a source of current, and a controlling switch.

7. A direction indicator including a pivoted indicator arm, electric lamps carried by said arm, electrically controlled means for raising the arm into signaling position, means for illuminating the lamps when the arm reaches said position and at the same time deënergizing said arm operating means, and an electrically controlled latch associated with the arm.

8. A direction indicator including a pivoted indicator arm, a buzzer, electrically operated means for moving the arm into signaling position, means for deënergizing said operating means when the arm reaches such position and for energizing said buzzer at the same time, an electrically operated latch structure associated with the arm, a source of current, and a controlling switch.

9. A direction indicator including a pivoted indicator arm, electrically operated means for moving the arm from non-signaling position into signaling position, electrically controlled latch mechanism adapted to hold the arm in either its signaling or non-signaling position, a switch adapted to be closed by said latch structure when such structure is operated to release the arm from non-signaling position, the closing of such switch energizing said arm operating means, a second switch adapted to be opened by said arm operating means when the arm reaches signaling position to deënergize said operating means, a source of current, and a controlling switch.

10. A direction indicator including a pivoted indicator arm, an electrically controlled latch mechanism associated with the arm for holding it in signaling or non-signaling position, a switch controlling said latch structure, electrically operated means adapted to move the arm into signaling position, a second switch adapted to be closed by said latch structure when the latter is operated to release the arm, the closing of this switch energizing the arm operating means, a third switch adapted to be operated by said arm operating means when the arm reaches signaling position, the operation of this switch deënergizing said operating means, and a source of current.

In testimony whereof I affix my signature in presence of two witnesses.

NATHANIEL W. KLEINMAN.

Witnesses:
HENRY KLEINMAN,
ISIDORE GARNITZ.